Oct. 23, 1934.  E. W. COLEMAN  1,977,715
STRUCTURAL MEMBER
Filed Aug. 8, 1931
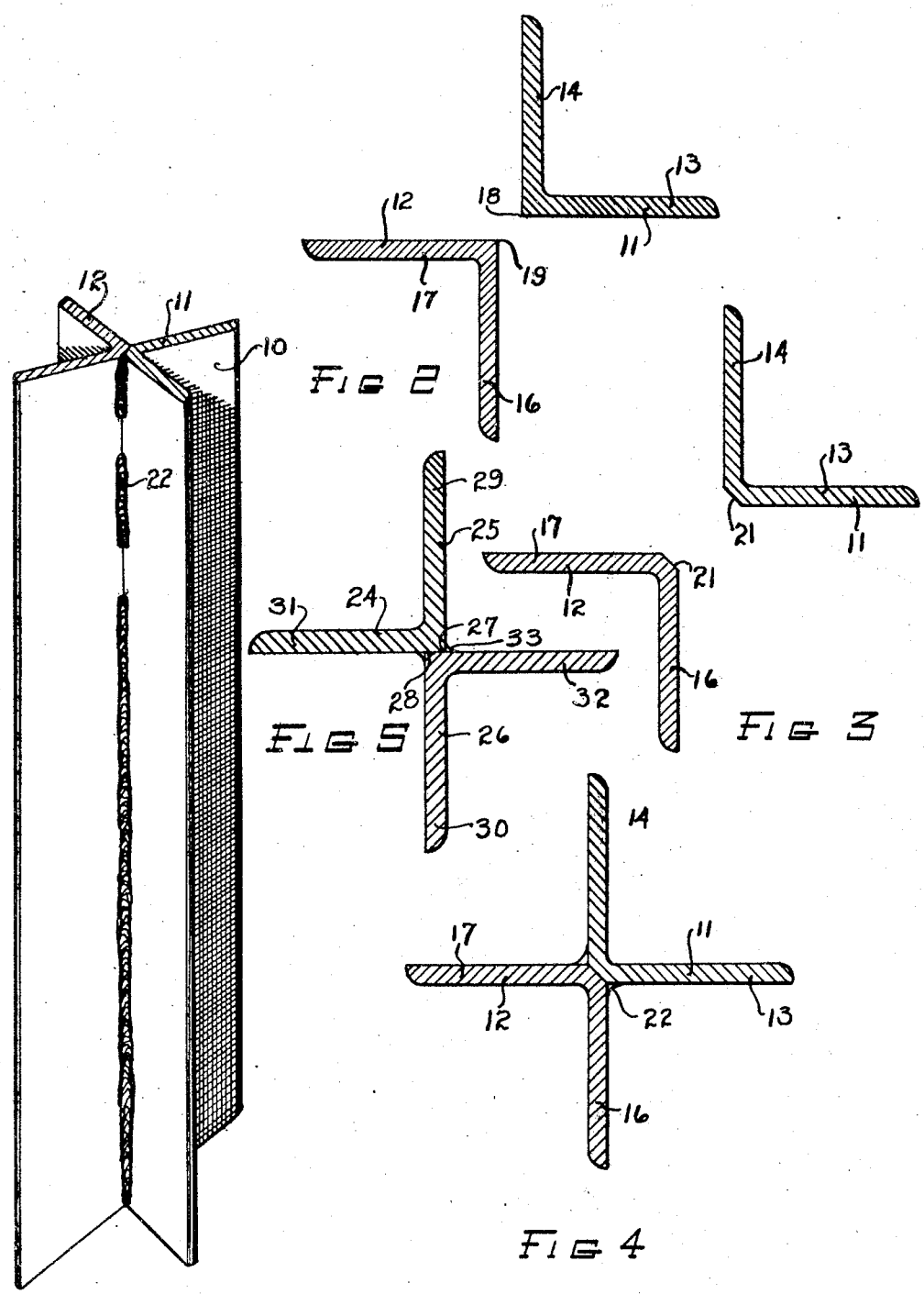
Inventor
Elmer W. Coleman Patented Oct. 23, 1934

1,977,715

UNITED STATES PATENT OFFICE 1,977,715

STRUCTURAL MEMBER

Elmer W. Coleman, Jamestown, N. Y., assignor to Dahlstrom Metallic Door Company, Jamestown, N. Y., a corporation of New York Application August 8, 1931, Serial No. 555,926

1 Claim. (Cl. 189—38)

This invention relates to an improvement in a structural member and more particularly to an arrangement formed by uniting standard structural sections.

The preferred embodiment of this invention, as shown in the drawing, discloses several methods by which to provide structural support through the use of a pair of angle elements which are reversely disposed with respect to each other and which, when brought into contact, are united by welding or any other suitable means to form a member having great resistance to all lateral and longitudinal forces incident to structures of the type in which this member is used.

The principal object of the invention is to provide a structural member comprising a pair of angle elements which are welded or otherwise suitably joined to form a post-like member having great resistance to all lateral and longitudinal forces.

Another object of the invention lies in the provision of a structural member comprising a pair of reversely disposed standard angle elements which are welded or otherwise suitably joined to form a support having great resistance to building stresses.

A further object of the invention lies in the provision of a structural element comprising a pair of reversely disposed angle elements which are joined together by welding or in any other suitable manner.

A still further object of the invention lies in the provision of a structural member comprising a pair of reversely disposed angle elements joined together at the heels so that the reversely disposed flanges lie substantially in the same plane.

Another and further object of the invention lies in the provision of a structural member comprising a pair of angle elements which are beveled at the heels and joined together along the beveled faces in any suitable manner as by welding.

Other and further objects of the invention will be more clearly understood from a consideration of the following specification which is taken in conjunction with the accompanying drawing, and in which Fig. 1 is a perspective view of the structural member showing one method of joining two angle elements together;

Fig. 2 is a sectional plan view of a pair of angle elements before the heels are beveled;

Fig. 3 represents a sectional plan view of the angle elements, showing the beveled edges formed on the heels;

Fig. 4 is a sectional plan view showing the angle elements of Figure 3 united to form a structural member; and Fig. 5 is a sectional view, showing a modification of the structure shown in Figure 1, the angle elements being offset to provide contacting faces.

Referring to Figures 1 to 4 of the drawing, the structural member therein disclosed, which will be generally indicated by the reference numeral 10, is shown to consist of a pair of angle elements 11 and 12, element 11 having flanges 13 and 14 and element 12 having flanges 16 and 17. Flanges 13 and 14 intersect to form a longitudinal heel 18 on the element 11 and a similar heel 19 formed by the intersecting flanges 16 and 17 on the element 12. Heels 18 and 19 are beveled off to form surfaces 21 which are at an angle to flanges 13, 14 and 16, 17.

As shown in Figure 3, the faces 21 of the elements 11 and 12 are brought together and united in any suitable manner, as by welding. One proposed method of joining the angles together is shown in Figure 1, where the adhesive medium is applied along the line of intersection formed by adjacent flanges of the elements 11 and 12. The adhesive may consist of a fillet of metal 22 arc welded or brazed in the corner. Another method of joining the elements together is to produce a continuous resistance weld between the two faces 21 of the elements 11 and 12.

The modification shown in Figure 5 of the drawing, provides a somewhat simpler method of producing a structural member substantially star-shaped in cross section. In this instance the member 24 is comprised of reversely disposed angle elements 25 and 26. The heels or outside angles 27 and 28, of the elements 25 and 26 respectively, are overlapped sufficient to cause flanges 29 and 30 to lie in the same plane. Flanges 31 and 32 will thus lie slightly out of the same plane with respect to each other. As in the above described modification, the contacting surfaces are permanently joined together through the use of an adhesive of fillet of metal 33, arc welded or brazed in the corner, or through the use of a continuous resistance weld between the contacting portions of the heels 27 and 28.

Although applicant has shown and described equal angle elements, it is obvious that the length of the flanges, length of the elements or the purpose of the structural member, may be modified as deemed advisable without departing from the spirit and scope of the invention, as set forth in the hereunto annexed claim.

Having thus set forth my invention what I claim as new and for which I desire protection by Letters Patent is:

A structural support comprising a pair of reversely directed standard angle elements, related face portions formed on the outside angle of each of said elements, said elements when joined along said face portions producing a support having pairs of opposed co-planar flanges.

ELMER W. COLEMAN.